(12) United States Patent
Christensen

(10) Patent No.: US 9,885,374 B2
(45) Date of Patent: Feb. 6, 2018

(54) HYDRAULIC SYSTEM OF A VEHICLE

(71) Applicant: Danfoss Power Solutions ApS, Nordborg (DK)

(72) Inventor: Carsten Christensen, Broager (DK)

(73) Assignee: Danfoss Power Solutions ApS, Nordborg (DK)

(*) Notice: Subject to any disclaimer, the term of this patent is extended or adjusted under 35 U.S.C. 154(b) by 171 days.

(21) Appl. No.: 14/875,935

(22) Filed: Oct. 6, 2015

(65) Prior Publication Data

US 2016/0108938 A1    Apr. 21, 2016

(30) Foreign Application Priority Data

Oct. 15, 2014 (EP) .................................. 14188986

(51) Int. Cl.
*F16D 31/02* (2006.01)
*F15B 11/17* (2006.01)
(Continued)

(52) U.S. Cl.
CPC .............. *F15B 11/17* (2013.01); *B60R 16/08* (2013.01); *B62D 5/062* (2013.01); *B62D 5/07* (2013.01);
(Continued)

(58) Field of Classification Search
CPC ..... F15B 11/162; F15B 11/165; F15B 11/167; F15B 11/17; F15B 11/163
(Continued)

(56) References Cited

U.S. PATENT DOCUMENTS 4,561,249 A    12/1985  Watanabe et al.
6,176,083 B1*   1/2001  Ikari ..................... E02F 9/2235
                                                        60/422
(Continued)

FOREIGN PATENT DOCUMENTS

CN    1436712 A    8/2003
CN  102015375 A    4/2011
(Continued)

OTHER PUBLICATIONS

European Search Report for European Patent Application No. EP14188986 dated Apr. 24, 2015.

*Primary Examiner* — Michael Leslie
(74) *Attorney, Agent, or Firm* — McCormick, Paulding & Huber LLP

(57) ABSTRACT

A hydraulic system of a vehicle is provided, said system including:
a first hydraulic circuit (1) having a first pressure source (2) and at least a first hydraulic consumer (3, 4),
a second hydraulic circuit (5) having a second pressure source (6) and at least a second hydraulic consumer (7),
connecting means (10, 11) allowing a flow of hydraulic fluid at least from said first hydraulic circuit (1) to said second hydraulic circuit (5),
and control means (16) for controlling operation of said hydraulic consumers (3, 4, 7). Such a hydraulic system should allow safe operation of a vehicle with low energy consumption of the hydraulic system. To this end said control means (16) are connected to summation demand means (12), said summation demand means (12) controlling flow of hydraulic fluid from at least said first hydraulic circuit (1) to said second hydraulic circuit (5), said summation demand means (12) being connected to operation mode signal means (17) outputting an operation mode signal indicative of an operation mode of said vehicle, wherein said
(Continued)

summation demand means (12) allow or block flow of hydraulic fluid from one hydraulic circuit (1) to another hydraulic circuit (5) in dependency of said operation mode signal.

11 Claims, 2 Drawing Sheets

(51) Int. Cl.
F15B 11/16 (2006.01)
B60R 16/08 (2006.01)
B62D 5/06 (2006.01)
E02F 9/20 (2006.01)
E02F 9/22 (2006.01)
B62D 5/07 (2006.01)

(52) U.S. Cl.
CPC .......... *E02F 9/2095* (2013.01); *E02F 9/2242* (2013.01); *E02F 9/2292* (2013.01); *E02F 9/2296* (2013.01); *F15B 11/163* (2013.01); *F15B 2211/20576* (2013.01); *F15B 2211/255* (2013.01); *F15B 2211/30595* (2013.01); *F15B 2211/426* (2013.01); *F15B 2211/63* (2013.01); *F15B 2211/6658* (2013.01); *F15B 2211/7142* (2013.01)

(58) Field of Classification Search
USPC .................................. 60/421, 422; 91/516
See application file for complete search history.

(56) References Cited

U.S. PATENT DOCUMENTS

| | | | | |
|---|---|---|---|---|
| 6,810,663 B2* | 11/2004 | Konishi | .................. | E02F 3/965 60/421 |
| 8,701,397 B2* | 4/2014 | Tanaka | .................. | E02F 9/2228 60/421 |
| 8,756,930 B2* | 6/2014 | Johnson | ................. | B62D 5/075 91/516 |
| 2011/0011076 A1* | 1/2011 | Tanaka | .................. | E02F 9/2228 60/396 |
| 2013/0098010 A1 | 4/2013 | Elder et al. | | |
| 2014/0129035 A1 | 5/2014 | Marquette et al. | | |

FOREIGN PATENT DOCUMENTS

| | | |
|---|---|---|
| CN | 102985703 A | 3/2013 |
| DE | 10 2008 038 793 A1 | 10/2009 |
| JP | H04-321804 A | 11/1992 |
| JP | H07-334247 A | 12/1995 |
| WO | 2011/068441 A1 | 6/2011 |
| WO | 2011/150010 A2 | 12/2011 |

* cited by examiner

HYDRAULIC SYSTEM OF A VEHICLE

CROSS REFERENCE TO RELATED APPLICATIONS

Applicant hereby claims foreign priority benefits under U.S.C. § 119 from European Patent Application No. EP14188986.5 filed on Oct. 15, 2014, the content of which is incorporated by reference herein.

TECHNICAL FIELD

The invention relates to a hydraulic system of a vehicle, said system comprising: a first hydraulic circuit having a first pressure source and at least a first hydraulic consumer, a second hydraulic circuit having a second pressure source and at least a second hydraulic consumer, connecting means allowing a flow of hydraulic fluid at least from said first hydraulic circuit to said second hydraulic circuit, and control means for controlling operation of said hydraulic consumers.

BACKGROUND

Such a hydraulic system is described, for example, in DE 10 2008 038 793 A1. The vehicle for which the known system is intended is an excavator having two crawlers, each crawler being driven by one of the two hydraulic circuits. Furthermore, each hydraulic circuit can be used to operate a further hydraulic consumer, like a turning drive for the upper part of the excavator, for the bucket, etc.

Under normal circumstances the two hydraulic circuits are connected to each other. The connecting means can interrupt this connection when the demand of hydraulic flow in one circuit is smaller than the maximum capacity of the respective pressure source and larger than a switching demand is. Such a switching demand can be, for example, 80% of the maximum capacity of the respective pressure source.

An excavator usually has rather constant operational conditions. As a rule it repeats a sequence of movements for a number of times.

Other vehicles show other behaviors. A tractor, for example, has to be driven on a road and in a field. Driving on the road requires a higher velocity than driving in a field. Furthermore, the steering behavior of a tractor on the road is different from the behavior in the field. During operation in a field, hydraulic consumers have to be actuated, for example a hitch or a front loader.

The use of different hydraulic circuits each being provided with an own pressure source has advantages in view of energy consumption and efficiency. However, in order to fulfill safety requirement control of the flow between the circuits can be complicated and cumbersome.

SUMMARY

The object underlying the invention is to allow safe operation of a vehicle with low energy consumption of the hydraulic system.

This object is solved in a hydraulic system as described above in that said control means are connected to summation demand means, said summation demand means controlling flow of hydraulic fluid from at least said first hydraulic circuit to said second hydraulic circuit, said summation demand means being connected to operation mode signal means outputting an operation mode signal indicative of an operation mode of said vehicle, wherein said summation demand means allow or block flow of hydraulic fluid from one hydraulic circuit to another hydraulic circuit in dependency of said operation mode signal.

The decision whether a flow of hydraulic fluid from one hydraulic circuit to another hydraulic circuit is allowed or not now is not only be made on the demand of the different hydraulic circuit but also on an operation mode of the vehicle. Consequently the control can be simplified depending on the operation mode of the vehicle a borrow of hydraulic fluid is not allowed in all cases. Furthermore, the pumps can be downsized compared to the prior art for energy cost reduction.

Preferably said summation demand means or said control means calculate a demand of said hydraulic consumers on basis of an actuation of said control means and allow a flow of hydraulic fluid from one hydraulic circuit to another hydraulic circuit provided that said operation mode signal indicates an operation mode or an actual working state of said vehicle in which said flow is admissible. The control means can, for example, be a joystick, a steering wheel or the like. Preferably said control means generate an electrical signal and all or at least most of the control means are connected to each other and to the summation demand means by a bus, for example, CAN-bus. These electrical signals are used to operate electrohydraulic valves. At the same time, the signals can be used to determine the actual demand so that this demand is known before or at least at the same time as the actuators have to be actuated. Therefore, it is not necessary to wait, for example, for the build-up of pressures on which the pressure sources have to react. This makes the system fast and reliable. On the other hand, only if the operation mode of the vehicle allows sharing of hydraulic fluid between two hydraulic circuits, the calculated demand is used to control the summation demand means accordingly.

Preferably said operation mode signal means comprise selector means which can be operated by an operator of said vehicle. The selector means can, for example, be in the form of switches or in the form of a turning knob so that, for example, at least five different operation modes can be selected. One of the operation modes can be driving on a road. Another operation mode can be working in the field. A third operation mode can be unloading a trailer, etc. The operator or the driver of the vehicle knows which operation mode is to be performed and can select the respective operation mode by means of the selector means.

Additionally or alternatively said operation mode signal means are connected to at least one sensor means, said sensor means detecting at least one operational parameter of said vehicle. In this way the selection of the operation mode can be automated. When, for example, the velocity of the vehicle exceeds a predetermined value it is clear that the vehicle does not move in the field but on a road. In another example the vehicle is stopped and a fixing brake is actuated. In this case it is clear that there is no demand for a flow of hydraulic fluid in the steering of the vehicle.

Preferably said operational parameter of said vehicle is selected from a group of parameters comprising speed of said vehicle, motor temperature of said vehicle, steering angle of said steering wheel, steering command of a steering joystick, load of said vehicle, traction force at a trailer coupling or hitch arm, engine load, fan speed, motor rotations per minute. All these parameters can be used to detect the operation mode of the vehicle or to predict a future operation mode. In some cases, the operation mode of the vehicle can be determined only by a combination of different parameters.

Preferably only said first hydraulic circuit has a pressure source satisfying the demand of hydraulic flow of said hydraulic circuit, wherein the at least second hydraulic circuit has an under dimensioned pressure source. In this case the first hydraulic circuit is the hydraulic circuit with the highest priority or the greatest importance. This hydraulic circuit must be able to work under all circumstances. The second hydraulic circuit would be able to work even with its under dimensioned pressure source alone, however, with a lower speed. Only when the first hydraulic circuit does not need the full capacity of the first hydraulic pressure source, the second hydraulic circuit can "borrow" hydraulic flow from the first pressure source.

In a preferred embodiment said vehicle comprises a steering being part of said first hydraulic circuit. The steering must be able to work under all circumstances. Therefore, the hydraulic circuit of the steering has a pressure source which is able to satisfy the demand of the steering.

In a further preferred embodiment said vehicle comprises working hydraulic means being part of said second hydraulic circuit. The working hydraulic means can be, for example, actuators for a hitch, for a front loader, for the unload function of a trailer, etc. When the capacity of the pressure source does not satisfy the demand commanded by the respective control means, these working hydraulic means still work, however, with a lower speed.

Preferably said vehicle comprises a hydraulic fan drive being part of a third hydraulic circuit. The hydraulic fan drive drives a fan which is used to produce a flow of air for cooling the internal combustion engine of the vehicle. Such a fan drive can, for a short time, work with reduced capacity.

Preferably said third hydraulic circuit has a priority lower than a priority of said first hydraulic circuit and higher than the priority of said second hydraulic circuit.

BRIEF DESCRIPTION OF THE DRAWINGS

Preferred examples of the invention will now be described in more detail with reference to the drawing, wherein.

DETAILED DESCRIPTION

Figure 1:
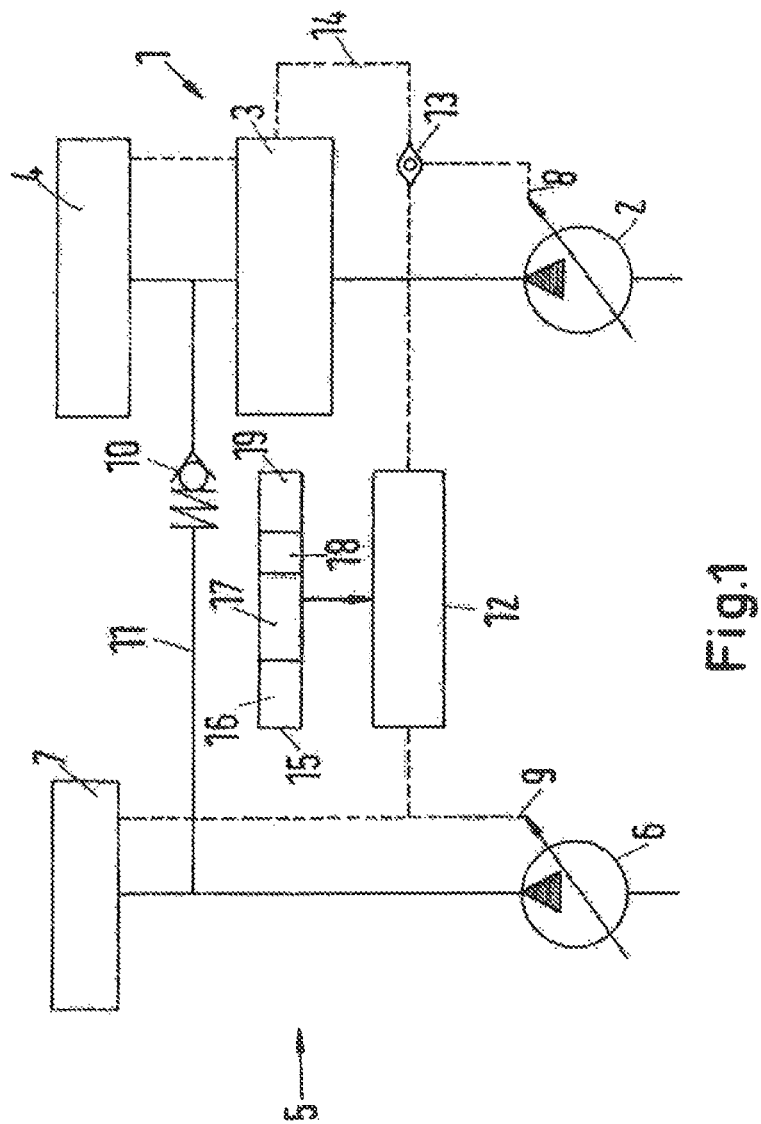
FIG. 1 is a schematic illustration of a first embodiment.

The invention is illustrated in the following using a tractor as example for the vehicle with the hydraulic system. The tractor itself is not shown in the drawing.

The tractor has a first hydraulic circuit 1 comprising a first pump 2 as a first pressure source and a hydraulic steering 3 as a first hydraulic consumer. The first steering circuit 1 comprises furthermore a trailer brake 4. However, the hydraulic steering 3 has the first priority and the trailer brake 4 has a second priority.

The tractor has furthermore a second hydraulic circuit 5. The second hydraulic circuit 5 comprises a second pump 6 as a second pressure source. Furthermore, the second hydraulic circuit 5 comprises a second hydraulic consumer 7, for example, an actuator for a hitch of the tractor.

The two pumps 2, 6 are pumps with a variable displacement, for example, having a swash plate the tilting of which can be adjusted. The first pump 2 has a LS-port 8 and the second pump 6 has an LS-port 9. The pressure arriving at the LS-ports 8, 9 are used to adjust the displacement of the pumps 2, 6.

The first hydraulic circuit 1 and the second hydraulic circuit 5 are connected to each other via a check valve 10 opening from the first hydraulic circuit 1 to the second hydraulic circuit 5. Therefore, a flow of hydraulic fluid from the first hydraulic circuit 1 to the second hydraulic circuit 5 is possible. In the present embodiment a flow in the opposite direction is not possible.

A connection line 11 in which the check valve 10 is positioned is connected to the first hydraulic circuit 1 downstream the hydraulic steering 3 so that in any case the hydraulic steering 3 can be supplied with the needed flow to obtain steering function with the full capacity of the first pump 2.

Summation demand means 12 are connected to the LS-port 9 of the second pump and to a shuttle valve 13, wherein the output of the shuttle valve 13 is connected to the LS-port 8 of the first pump 2. The other input of the shuttle valve 13 is connected to the LS-line 14 coming from the steering 3. Furthermore, the line 11 is connected to said summation demand device 12 which is connected to said second hydraulic circuit.

The summation demand means 12 is connected to a unit 15 in which a number of functions are combined. Each function can be performed by separate means. However, it is also possible to realize two or more functions by the same means, for example a microprocessor or microcontroller.

First of all, the unit 15 is connected to control means (not shown) wherein each control means is provided for controlling the hydraulic consumers 3, 4, 7. The control means for the steering 3 can, for example, be a steering wheel or a steering joystick. The control means for the trailer brake 4 can be a braking pedal. The control means for the hydraulic consumers 7 can, for example, be a joystick or the like. The hydraulic consumers 7 can be, for example a hydraulic cylinder for the hitch of the tractor, a double acting hydraulic cylinder for a front loader, or the like.

These control means are shown together in a box 16 being part of the unit 15. Furthermore, the unit 15 comprises operation mode signal means 17. The operation mode signal means 17 are connected to selector means 18 and/or to sensor means 19. The selector means 18 can be in the form of one or more switches or in the form of a turning wheel with which, for example, five or six or more different modes of operation of the tractor can be selected. One mode of operation can be driving on a road. A second mode of operation can be working in the field. A third mode of operation can be unloading of a trailer. A forth mode of operation can be working with the front loader etc. These modes of operation can be selected by the driver or operator of the tractor.

Furthermore, the sensor means 19 can be used as well to select the mode of operation automatically. When, for example, the velocity of the tractor is higher than a predetermined velocity, then it is quite sure that the tractor is not working in the field but is driving on the road. When a fixing brake is actuated, it is quite clear that the tractor is not driving on the road. The sensor means 19 can have a plurality of sensors to detect a number of parameters, among others the velocity or speed of the tractor, the motor temperature of the tractor, the steering angle of a steering wheel, a steering command of a steering joystick, a load of the tractor, the traction force at a trailer coupling or hitch arm, the engine load or the speed of a cooling fan for the motor of the tractor. Further parameters can be the fuel consumption, the noise of the motor, up and down acceleration of the tractor, ambient temperature and so on. The unit 15 can determine on the basis of these parameters or on the basis of a combination of some of these parameters the operation mode of the tractor. When, for example, the up and down acceleration of the tractor exceeds a predetermined value it is quite clear that, for example, the tractor is working in the field and not running on a road.

The summation demand device 12 receives the pressure at LS-port 9 of the second pump 6 and therefore the load pressure of the second hydraulic circuit 5. The summation demand device can therefore switch so that the two hydraulic circuits 1, 5 are connected or not.

In the present embodiment, only the first pump 2 is able to fully satisfy the flow demand of its first hydraulic circuit 1. The second pump 6 is not able to fully satisfy the flow demand of its second hydraulic circuit 5. When the controller 16 detects that the second hydraulic circuit 5 has a flow demand higher than that the second pump 6 can satisfy, it increases the pressure at the LS-port 8 of the first pump 2. However, this pressure increase is performed only when the operation mode of the tractor allows that the second hydraulic circuit 5 borrows hydraulic fluid from the first hydraulic circuit 1. This is, for example, the case when the tractor is working in the field, more precisely during a head land turn during field operation. In this case the hitch or another consumer should be actuated with the highest speed possible. On the other hand, the steering 3 needs as much flow as possible to steer the steered wheels with the highest possible speed as well. When, for example, the steering needs less time than the lifting of the hitch, then the lifting of the hitch can be performed by supplying hydraulic fluid from the first hydraulic circuit 1 to the second hydraulic circuit 5 as long as the steered wheels do not need a steering movement or as long as it is satisfied with flow because of a low RPM (rotation per minute).

When the pressure at the LS-port 8 of the first pump 2 is increased, the output pressure of the first pump 2 is increased as well so that the check valve 10 opens and allows flow of the hydraulic fluid from the first circuit 1 to the second circuit 5.

In the present example both pumps 2, 6 are shown as variable pumps. It is, however, possible, to replace one or both pumps 2, 6 with fixed pumps. In this case the fixed pumps should have other possibilities for control of pressure and flow.

Figure 2:
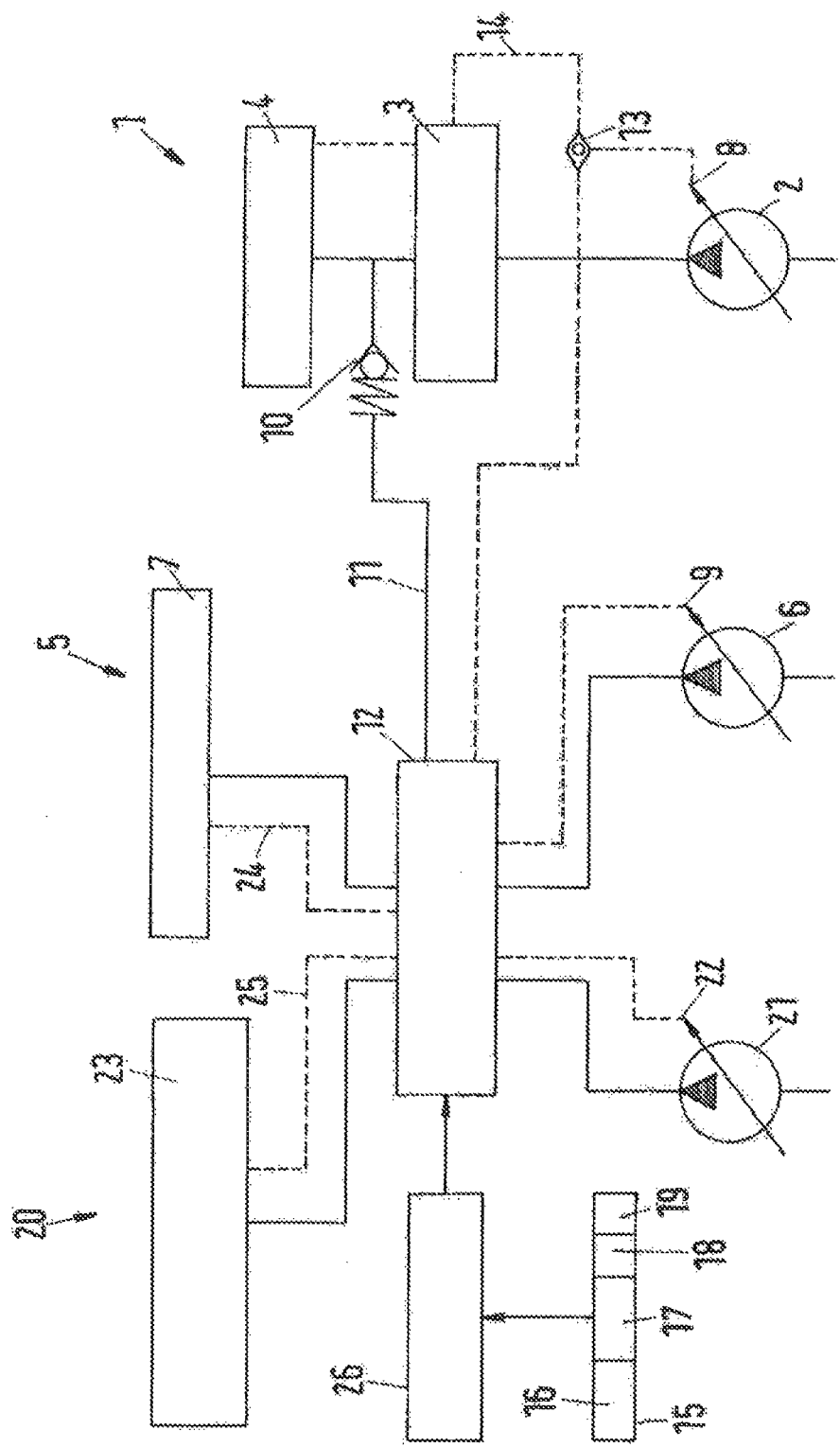
FIG. 2 is a schematic illustration of a second embodiment.

FIG. 2 shows a second embodiment of a hydraulic system of a tractor. The tractor itself is again not shown. The same elements as in FIG. 1 are referred to with the same numerals.

The embodiment of FIG. 2 shows a third hydraulic circuit 20 having a third pump 21 as third pressure source. The third pump 21 is a variable pump as well receiving a load sensing signal via a LS-port 22. Furthermore, the third hydraulic circuit 20 has a hydraulic fan drive 23 for the engine or vehicle cooling system. The fan drive 23 is a third hydraulic consumer.

The summation demand means 12 receives load sensing signal from the hydraulic consumer 7 of the second hydraulic circuit 5 via a LS-line 24 and from the fan drive 22 via a LS-line 25. Furthermore, the summation demand means 12 supplies a LS-signal to the LS-port 22 of the third pump 21, to the LS-port 9 of the second pump 6 and to the LS-port 8 of the first pump 2 provided that the LS-pressure of the summation demand device 12 is higher than the LS-pressure of the steering 3.

FIG. 2 shows furthermore a controller 26 as separate part. However, this controller 26 can also be part of the unit 15.

The controller 26 calculates a flow demand of each of the hydraulic circuits 1, 5, 20 on basis of the output signals of the control means 16. In this way the hydraulic consumers of the hydraulic circuits 1, 5, 20 can react faster as in a case in which the pumps 2, 6, 21 have to react on a pressure or flow demand of the hydraulic consumers.

In the embodiment shown in FIG. 2 the summation demand device not only combine the LS-signals, if needed, but it also combines or shares the hydraulic flow from the first hydraulic circuit 1 to the second hydraulic circuit 5 and/or to the third hydraulic circuit 20.

The steering 3 in the first hydraulic circuit 1 has the highest priority. The fan drive 23 in the third hydraulic circuit 20 has the second priority and the working hydraulic of the hydraulic consumers 7 in the second hydraulic circuit 5 has the last priority. The pump 2 in the first hydraulic circuit 1 is nominal sized, i.e. it can fully satisfy the demand of hydraulic flow in the first hydraulic circuit to 100%. The pumps 6, 21 in the second hydraulic circuit 5 and in the third hydraulic circuit 20 are undersized. If the hydraulic circuits 5, 20 have to operate at full load or full speed, these hydraulic circuits 5, 20 have to receive flow of hydraulic fluid from the first hydraulic circuit 1 or of the respective other hydraulic circuit 20, 5.

The input signals for the first hydraulic circuit 1 can be a steering signal for the hydraulic steering 3 and a signal according to the vehicle speed. Input for the second hydraulic circuit 5 can be a control signal for the hydraulic actuators of the hydraulic consumers 7 and a vehicle speed as well. An input for the third hydraulic circuit 20 can be the coolant temperature and the fan speed. Furthermore, the engine load and the hydraulic load (i.e. pressure and flow) can be an input parameter as well.

When, for example, the tractor is driving on the road, a high cooling capacity is needed so that the fan drive 23 has to be operated with the highest possible speed. Since the steering 3 needs not the full capacity of the first pump 2 and the hydraulic consumers 7, for example, a hitch active damping need less flow, the fan drive 23 can get a supplementary flow from the first hydraulic circuit 1 and from the second hydraulic circuit 2. However, the unit 15 has to detect that the operation mode is "driving on road".

When in another example front loader work has to be performed, medium cooling capacity is needed. However, the high flow to the loader actuator the hydraulic consumer 7 is necessary and a high flow to fast steer mode as well.

In this case the fan drive 23 is operated with a medium speed so that the pump 21 can be operated to produce a higher flow than needed by the fan drive 23. This excess flow can be delivered to the second hydraulic circuit 5 so that the front loader actuators can be operated with a higher speed. Although during front loader work there is usually a high demand of hydraulic flow for the steering 3, the high flow is demanded only during rather short time periods when the steered wheels are actually moved to another angle position. In the pauses between these movements of the steered wheels there is an excess flow produced by the first pump 2 which can be delivered to the second hydraulic circuit as well.

However, the supply of hydraulic fluid from the third hydraulic circuit 20 to the second hydraulic circuit 5 and from the first hydraulic circuit 1 to the second hydraulic circuit 5 requires that the unit 15 detects that the tractor is in the front loader work operation mode.

Another possible mode is the head land turn during field operation, for example, the operation of an air seeder. In this case, a high cooling capacity is needed and a high flow to hydraulic consumer 7, for example, said air seeder. Furthermore, the hydraulic steering 3 needs a high flow for fast steer mode as well.

Since the head land turn requires usually a time of less than one minute, it is possible to reduce the cooling capacity and to decrease the flow delivered to the fan drive 23 so that it is possible to deliver excess hydraulic flow from the third hydraulic circuit 20 to the hitch actuator. Furthermore, the air seeder motor can carry on rotating but could be reduced slightly in speed. Nevertheless, a high flow is needed. As in the front loader work, the steering 3 is operated in fast steer mode thus needing a high flow. However, in the periods between the steering movement of the steered wheels it is possible to deliver the excess flow of hydraulic fluid from the first hydraulic circuit to the second hydraulic circuit.

The head land turn operation can be detected by the unit 15 when, for example, the hitch is operated and at the same time the steering 3 is operated with fast steer mode.

Another possibility would be that a trailer is unloaded. In this case a fixing brake is actuated which can be detected by a sensor. When the fixing brake is actuated, it is clear that the steering 3 needs less flow or no flow. Therefore, the flow produced by the first pump 2 can be used to lift the trailer platform very fast.

The embodiments described above are provided by way of example only. The skilled person will be aware of many modifications, changes and substitutions that could be made without departing from the scope of the present disclosure. The claims of the present disclosure are intended to cover all such modifications, changes and substitutions as fall within the spirit and scope of the disclosure.

What is claimed is:

1. A hydraulic system of a vehicle, said system comprising:
   a first hydraulic circuit having a first pressure source and at least a first hydraulic consumer,
   a second hydraulic circuit having a second pressure source and at least a second hydraulic consumer,
   connecting means allowing a flow of hydraulic fluid at least from said first hydraulic circuit to said second hydraulic circuit, and
   control means for controlling operation of said hydraulic consumers,
   wherein said control means are connected to summation demand means, said summation demand means controlling flow of hydraulic fluid from at least said first hydraulic circuit to said second hydraulic circuit, said summation demand means being connected to operation mode signal means outputting an operation mode signal indicative of an operation mode of said vehicle,
   wherein said summation demand means allow or block flow of hydraulic fluid from one hydraulic circuit to another hydraulic circuit depending on said operation mode signal,
   wherein said operation mode signal means comprise selector means which can be operated by an operator of said vehicle for selecting the respective operation mode, and
   wherein said operation mode signal means are connected to at least one sensor means, said sensor means detecting at least one operational parameter of said vehicle and automatically selecting the respective operation mode, said operational parameter of said vehicle is selected from a group of parameters comprising speed of said vehicle, motor temperature of said vehicle, steering angle of a steering wheel, steering command of a steering joy stick, load of said vehicle, traction force at a trailer coupling or hitch arm, engine load, fan speed, motor rotations per minute.

2. The system according to claim 1, wherein said summation demand means or said control means calculate a demand of said hydraulic consumers on the basis of an actuation of said control means and allow the flow of hydraulic fluid from one hydraulic circuit to another hydraulic circuit provided that said operation mode signal indicates an operation mode or an actual working state of said vehicle in which such flow is admissible.

3. The system according to claim 1, wherein only said first hydraulic circuit has a pressure source satisfying the demand of hydraulic flow of said first hydraulic circuit, wherein the at least second hydraulic circuit has an under dimensioned pressure source.

4. The system according to claim 3, wherein said vehicle comprises a steering being part of said first hydraulic circuit.

5. The system according to claim 3 wherein said vehicle comprises working hydraulic means being part of said second hydraulic circuit.

6. The system according to claim 3, wherein said vehicle comprises a hydraulic fan drive being part of a third hydraulic circuit.

7. The system according to claim 6, wherein said third hydraulic circuit has a priority lower than a priority of said first hydraulic circuit and higher than a priority of said second hydraulic circuit.

8. The system according to claim 2, wherein only said first hydraulic circuit has a pressure source satisfying the demand of hydraulic flow of said first hydraulic circuit, wherein the at least second hydraulic circuit has an under dimensioned pressure source.

9. The system according to claim 4, wherein said vehicle comprises working hydraulic means being part of said second hydraulic circuit.

10. The system according to claim 4, wherein said vehicle comprises a hydraulic fan drive being part of a third hydraulic circuit.

11. The system according to claim 5, wherein said vehicle comprises a hydraulic fan drive being part of a third hydraulic circuit.

* * * * *